(12) United States Patent
Jansen et al.

(10) Patent No.: US 7,482,423 B2
(45) Date of Patent: Jan. 27, 2009

(54) POLYCARBONATES AND METHOD OF PREPARING SAME

(75) Inventors: Bernd Jansen, Bergen Op Zoom (NL); Jan Henk Kamps, Bergen op Zoom (NL); Edward Kung, Bergen op Zoom (NL); Patrick Joseph McCloskey, Watervliet, NY (US); Paul Michael Smigelski, Jr., Schenectady, NY (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 172 days.

(21) Appl. No.: 11/427,861

(22) Filed: Jun. 30, 2006

(65) Prior Publication Data

US 2008/0004417 A1   Jan. 3, 2008

(51) Int. Cl.
*C08G 64/00* (2006.01)
*C08G 63/02* (2006.01)

(52) U.S. Cl. ............ 528/196; 264/176.1; 264/219; 528/198

(58) Field of Classification Search ............ 264/176.1, 264/219; 528/196, 198
See application file for complete search history.

(56) References Cited

U.S. PATENT DOCUMENTS

| | | | |
|---|---|---|---|
| 4,323,668 A | 4/1982 | Brunelle | |
| 5,026,817 A | 6/1991 | Sakashita et al. | |
| 5,091,591 A | 2/1992 | Cipullo | |
| 5,151,491 A | 9/1992 | Sakashita et al. | |
| 5,221,761 A | 6/1993 | Jen et al. | |
| 5,276,129 A | 1/1994 | Sakashita et al. | |
| 5,412,061 A | 5/1995 | King, Jr. et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Bradck et al. | |
| 6,548,623 B2 | 4/2003 | Brunelle et al. | |
| 6,569,985 B2 | 5/2003 | McCloskey et al. | |
| 6,590,068 B2 | 7/2003 | Brack et al. | |
| 6,600,004 B1 | 7/2003 | McCloskey et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,790,929 B2 | 9/2004 | Silvi et al. | |
| 6,960,641 B2 | 11/2005 | O'Neil et al. | |
| 2002/0132957 A1 | 9/2002 | Brack et al. | |
| 2003/0050427 A1 | 3/2003 | Brunelle et al. | |
| 2003/0139529 A1 | 7/2003 | O'Neil et al. | |
| 2003/0149223 A1 | 8/2003 | McCloskey et al. | |
| 2004/0068086 A1 | 4/2004 | Day et al. | |
| 2004/0087756 A1 | 5/2004 | Ramesh et al. | |
| 2005/0234211 A1 | 10/2005 | Martinez et al. | |
| 2006/0069228 A1 | 3/2006 | McCloskey et al. | |
| 2008/0004418 A1 | 1/2008 | Jansen et al. | |

FOREIGN PATENT DOCUMENTS

| | | |
|---|---|---|
| JP | 5009282 | 1/1993 |
| JP | 10-101786 | 4/1998 |
| JP | 10-101787 | 4/1998 |
| JP | 11-302228 | 11/1999 |
| JP | 2000129112 | 5/2000 |
| JP | 2002309015 | 10/2002 |
| WO | 03040208 | 5/2003 |
| WO | 03106149 | 12/2003 |

*Primary Examiner*—Terressa M Boykin
(74) *Attorney, Agent, or Firm*—Marina Larson & Associates, LLC

(57) ABSTRACT

Polycarbonates incorporating terminal carbonate groups derived from ester-substituted activated carbonates, for example terminal methyl salicyl carbonate (TMSC) derived from the use of BMSC as the activated carbonate in a transesterification process, have unfavorable properties with respect to color, hydrolytic stability and thermal stability, particularly when the polycarbonate containing such end groups is molded. The number of activated carbonate end groups formed during the melt transesterification formation of polycarbonate can be reduced, however, without sacrificing the benefits of using an activated diaryl carbonate, and without requiring a separate reaction or additional additives by reacting a dihydroxy compound with an activated diaryl carbonate in the presence of an esterification catalyst to produce a polycarbonate, wherein the molar ratio of activated diaryl carbonate to dihydroxy compound is less than 1 when expressed to at least three decimal places, for example 0.996 or less.

34 Claims, 9 Drawing Sheets

BPA ("uncapped"/free OH)

US 7,482,423 B2

POLYCARBONATES AND METHOD OF PREPARING SAME

BACKGROUND OF THE INVENTION

The present invention relates to polycarbonates and to a method of preparing same.

Polycarbonates are generally produced through one of two types of processes: an interfacial process or a melt transesterification process. In the melt transesterification process, dihydroxy compounds such as biphenol A are reacted with a carbonic acid diesters. For many purposes, the carbonic acid diester may be a diaryl carbonate such as diphenyl carbonate.

It is also known to use the melt transesterification process with activated diaryl carbonates. For example, U.S. Pat. No. 4,323,668 describes a polycarbonate transesterification process comprising reacting (ortho-alkoxycarbonylaryl)carbonates and a dihydric phenol under transesterification reaction conditions. In the specific examples, U.S. Pat. No. 4,323,668 makes uses of bis-methylsalicylcarbonate (BMSC) as the diaryl carbonate. Use of activated diaryl carbonates is also described in U.S. Pat. No. 6,420,512, U.S. Pat. No. 6,506,871, U.S. Pat. No. 6,548,623, U.S. Pat. No. 6,790,929, U.S. Pat. No. 6,518,391, US 2003/0139529, and US 2003/0149223. When these activated carbonates are used, internal residues and end-caps derived from the activated diaryl carbonate are incorporated into the final polymer. See, US patent Publication No. 20030050427 and 20030149223.

SUMMARY OF THE INVENTION

Applicants have now found that polycarbonates incorporating terminal carbonate groups derived from ester-substituted activated carbonates, for example terminal methyl salicyl carbonate (TMSC) derived from the use of BMSC as the activated carbonate in a transesterification process, have unfavorable properties with respect to color, hydrolytic stability and thermal stability, particularly when the polycarbonate containing such end groups is molded. The present application provides a method for reducing the number of activated carbonate end groups formed during the melt transesterification formation of polycarbonate, without sacrificing the benefits of using an activated diaryl carbonate, and without requiring a separate reaction or additional additives.

In accordance with the method of the present invention, polycarbonate is prepared by reacting a dihydroxy reaction component comprising a dihydroxy compound with a carbonate reaction component comprising an activated diaryl carbonate in the presence of an esterification catalyst to produce a polycarbonate, wherein the molar ratio of the carbonate reaction component to the dihydroxy reaction components is less than 1 when expressed to at least three decimal places, for example 0.996 or less. In specific embodiments, the ratio is between 0.962 and 0.996, for example between 0.968 and 0.996. In another specific embodiment, the ratio is between 0.971 and 0.994.

Polycarbonates made in accordance with the methods of the invention have desirable properties not generally found in polycarbonates made according to other methods, and are structurally different from such polycarbonates. In particular, the polycarbonates made in accordance with the invention have both low levels of terminal ester-substituted carbonate end groups, for example less that 0.5 mole %, a non-salicylate OH to carbonate end group ratio of at least 0.1, and low levels of Fries rearrangement products, for example less than 1000 ppm. Further, the resulting polycarbonates contain low levels of residual free salicylates, for example less than 500 ppm. As a result, the resulting polycarbonate composition is suited to molding applications, because it retains transparency without discoloring when subjected to elevated molding temperatures.

DETAILED DESCRIPTION OF THE INVENTION

Definitions

As used in the specification and claims of this application, the following definitions, should be applied:

"a", "an", and "the" as an antecedent refer to either the singular or plural. For example, "an aromatic dihydroxy compound" refers to either a single species of compound or a mixture of such species unless the context indicates otherwise.

Figure 1A:
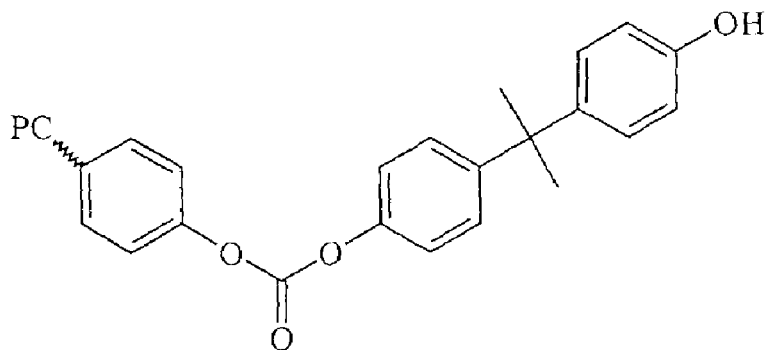
FIG. 1A-I shows various types of end groups that can form when polycarbonate (PC) is formed used bisphenol A and an activated carbonate.
Figure 1B:
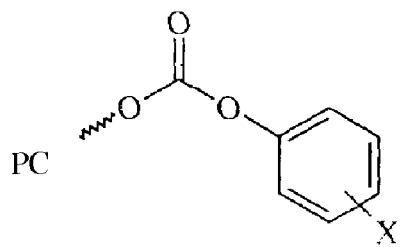
Figure 1C:
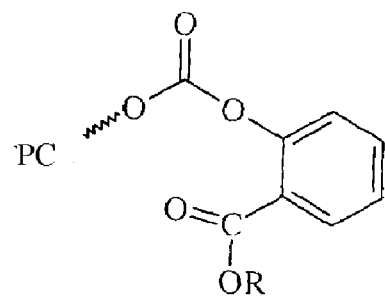
Figure 1D:
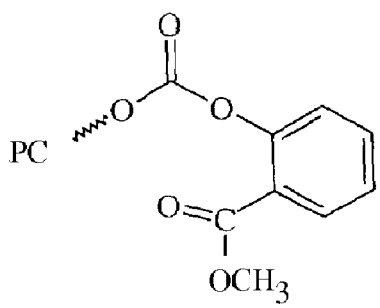
Figure 1E:
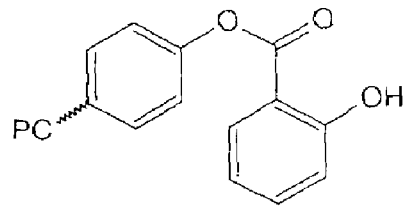
Figure 1F:
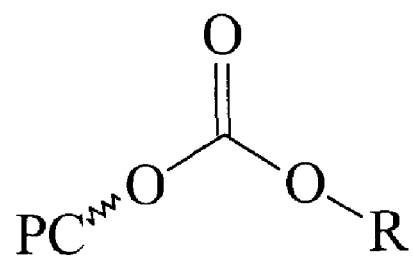
Figure 1G:
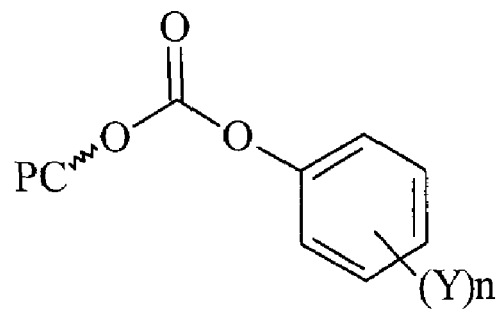
Figure 1J:
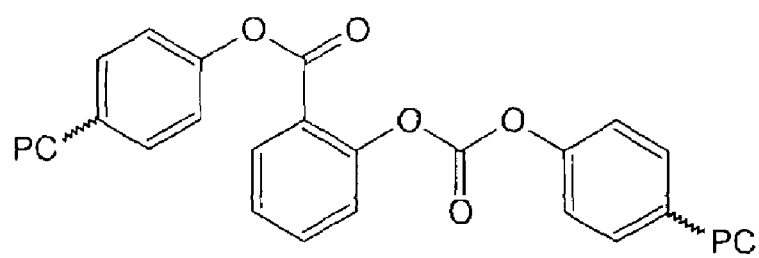
FIG. 1J shows the structure of an internal ester linkage which can form when an ester-substituted diaryl carbonate BMSC is used in a reaction with bisphenol-A.
Figure 1H:
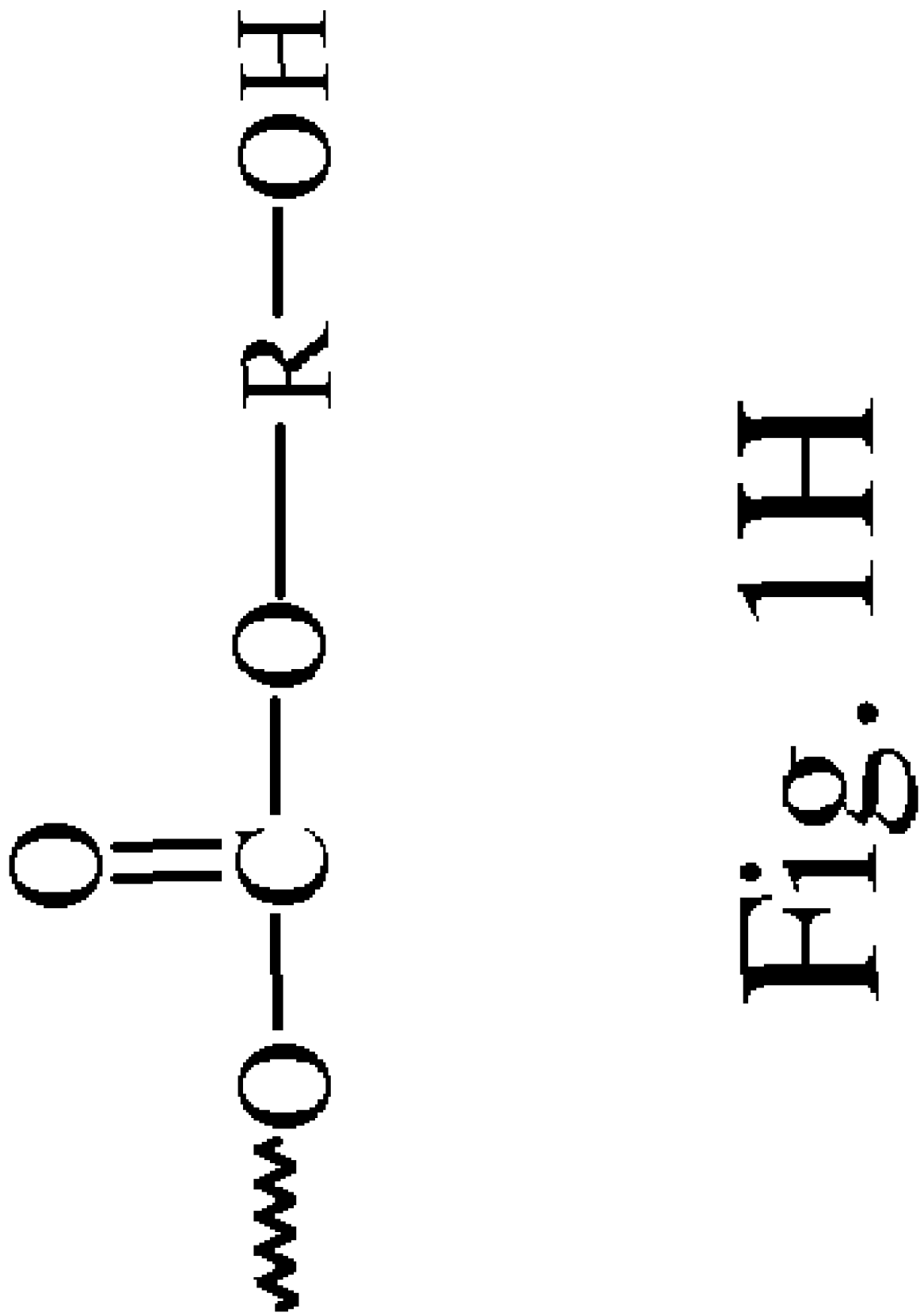
Figure 1I:
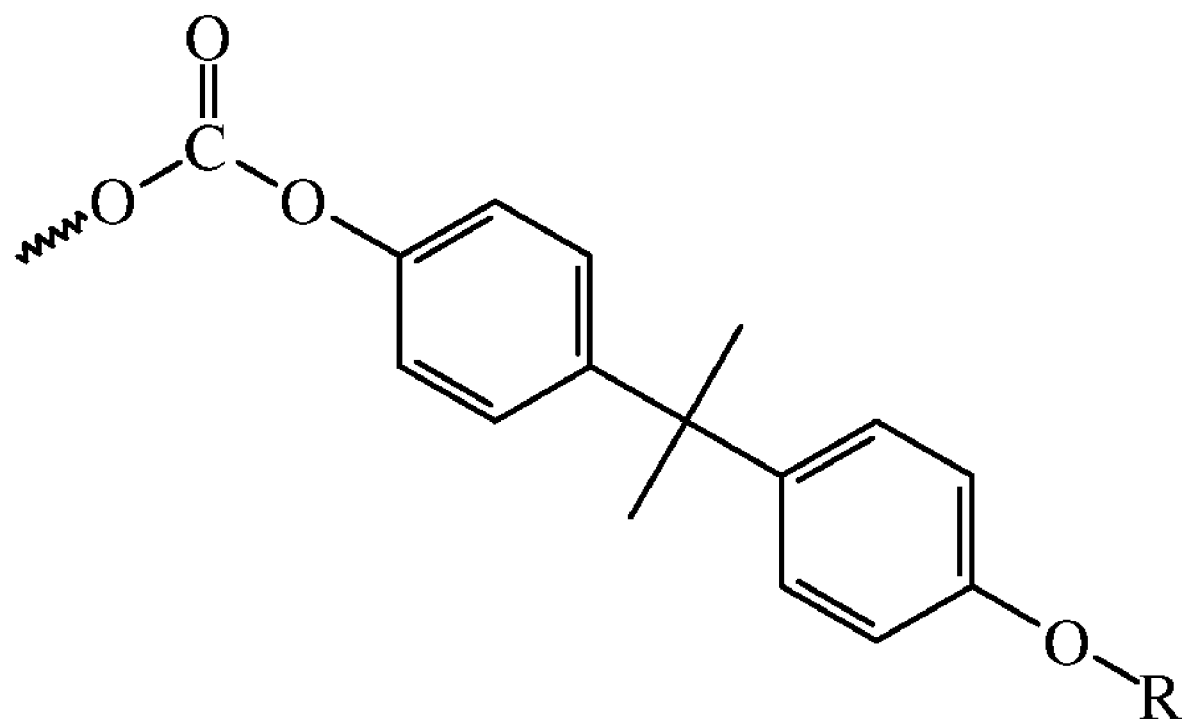

"end groups" refer to the terminal group on the ends of chains in the polycarbonate. FIGS. 1A-1F shows examples of some of the types of different end groups that can form when polycarbonate (PC) is formed used bisphenol A and an activated ester-substituted diaryl carbonyl such as BMSC. FIG. 1A shows a portion of a BPA polycarbonate, with an internal carbonate linkage and a free OH end group. PC represents the balance of the polycarbonate chain. FIG. 1B shows a generalized structure of an activated carbonate end group in which X is one or more electron-withdrawing substituents at the ortho and para positions. FIG. 1C shows the structure of salicyl carbonate end group, where R is an alkyl (for example methyl, ethyl, propyl, butyl or pentyl), phenyl or benzyl group. FIG. 1D shows a methyl salicyl carbonate end group (T-MSC). FIG. 1E shows a salicyl-OH end group. FIG. 1F shows a non-activated carbonate end group in which R is defined as in Fig 1C. For example, such end groups may be formed from the transesterification reaction to incorporate the alcoholic byproduct (e.g. methanol) formed from the hydrolysis or transesterification reaction of the salicyl ester of an activated carbonate (e.g. BMSC or T-MSC). FIG. 1G shows a non-activated end group that can result from the use of chain stoppers such as para-cumyl phenol (PCP). Y is independently hydrogen, alkyl, aryl or aralkyl, and n is an integer between 1 and 5, inclusive. FIG. 1H shows a further form of non-salicylate OH end group. In FIG. 1H, R is optionally substituted linear or branched alkyl, phenyl, aryl or. aralkyl. FIG. 1I shows an ether end group, for example, as may be formed by a SN2 reaction of a free OH of a phenolic end group like BPA (FIG. 1A) and the methyl ester functional group on methyl salicylate, BMSC, or terminal methyl salicylate (T-MSC). Such a reaction results from the nucleophilic attack of a phenolic anion on the methyl ester to expel an acidic carboxylic acid leaving group.

In the specification and claims of this application, the mol % of an end-group or type of end-group is expressed as a mole percentage of the dihydroxy compound incorporated in the polymer. There are several ways of measuring this which are discussed below.

"Non-salicylate OH to carbonate end group ratio" as used herein refers to the ratio of the mol % of OH end groups of the type shown in FIGS. 1A and 1H to carbonate-derived end groups of the types shown in any of FIGS. 1B to 1D, and FIGS. 1F to 1H. Note that FIG. 1A shows a BPA end group, but it could also be a residue of a different monomer, as shown in FIG. 1H. In accordance with the invention, this ratio is at least 0.1, for example at least 0.15. In an embodiment of the invention, the ratio is at least 0.2, for example at least 0.3 or 0.4. This ratio distinguishes the product formed using the method of the present invention from that formed when excess activated diaryl carbonate is used. When the reaction goes to completion in the latter case, no appreciable amount of free, non-salicylate OH end groups derived from the dihydroxy compound remains.

As used herein the term "Fries product" or "Fries rearrangement product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A species upon complete hydrolysis of the product polycarbonate.

The terms "Fries reaction" and "Fries rearrangement" are used interchangeably herein.

Figure 3A:
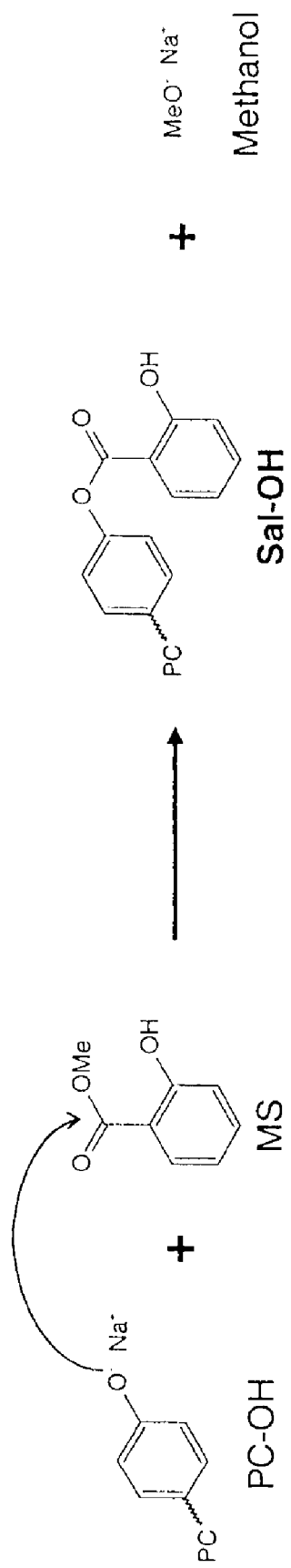
FIGS. 3A-B show side reactions through which by-products such those depicted in FIGS. 1B-F can occur during the process of FIG. 2.
Figure 3B:
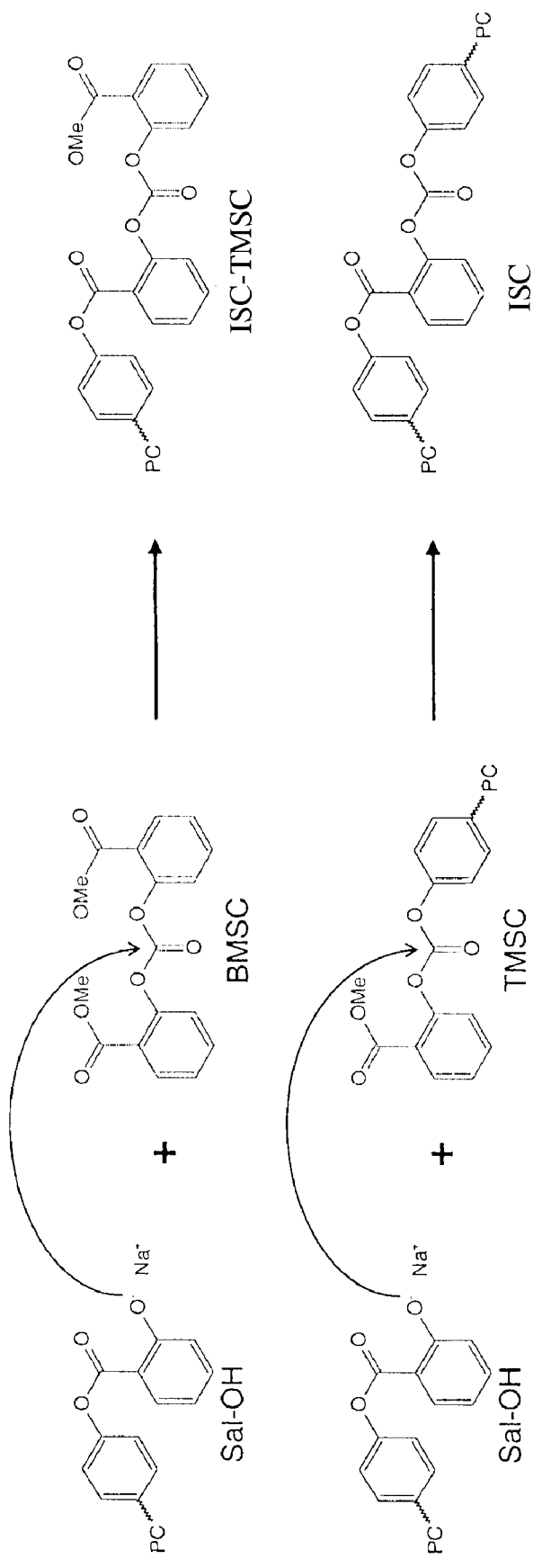

"internal-ester carbonate" or "IEL" refers to a linkage derived from an ester-substituted diaryl carbonate that is formed internally in place of the normal carbonate linkage. FIG. 1J shows the structure of an internal ester linkage, and FIGS. 3A and 3B show reactions to form such internal ester linkages.

"polycarbonate" refers to an oligomer or polymer comprising residues of a dihydroxy compound joined by carbonate linkages. In certain embodiments of the invention, the polycarbonate comprises residues of an aromatic dihydroxy compound and has a number average molecular weight, Mn measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers.

"dihydroxy reaction component" refers to one component of the reaction mixture used in the method of the invention to make polycarbonate. The dihydroxy reaction component comprises one or more dihydroxy compounds. In addition, when the product polycarbonate is a poly(carbonate-co-ester), diacids incorporated in the reaction mixture are part of the dihydroxy reaction component for determining the molar ratio of the reactants.

"carbonate reaction component" refers to a second component of the reaction mixture used in the method of the invention to make polycarbonate. The carbonate reaction component comprises one or more activated diaryl carbonates. In addition, when the product polycarbonate is a poly(carbonate-co-ester), diesters incorporated in the reaction mixture are part of the carbonate reaction component for determining the molar ratio of the reactants.

As used herein, the molar ratio of carbonate reaction component to dihydroxy reaction component refers to the molar ratio based on the amounts of these components as added. As noted below, there are various factors that can cause a specific reaction to depart from the theoretical, including impurities, reduced activity of monomers used in making poly(carbonate-co-esters), and these incidental variations are not taken into account in determining the molar ratio.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

Materials

In the following discussion of the methods and compositions of the invention, the following materials may be employed:

A. Dihydroxy Compounds

The dihydroxy compound used in the method of the invention may be an aromatic or an aliphatic dihydroxy compound. In certain embodiments, an aromatic dihydroxy compound is preferred.

Aliphatic dihydroxy compounds that are suitably used in the present invention include without limitation butane-1,4-diol, 2,2-dimethylpropane-1,3-diol, hexane-1,6-diol, diethylene glycol, triethylene glycol, tetraethylene glycol, octaethylene glycol, dipropylene glycol, N,N-methyldiethanolamine, cyclohexane-1,3-diol, cyclohexane-1,4-diol, 1,4-dimethylolcyclohexane, p-xylene glycol, 2,2-bis(4-hydroxycyclohexyl) propane, and ethoxylated or propoxylated products of dihydric alcohols or phenols such as bis-hydroxyethyl-bisphenol A, bis-hydroxyethyl-tetrachlorobisphenol A and bis-hydroxyethyl-tetrachlorohydroquinone. Other aliphatic dihydroxy compounds include 3,9-bis(2-hydroxyethyl)-2,4,8,10-tetraoxaspiro[5.5]undecane, 3,9-bis(2-hydroxy-1,1-dimethylethyl)-2,4,8,10-tetraoxaspiro[5.5]undecane, 3,9-bis(2-hydroxy-1,1-diethylethyl)-2,4, 8,10-tetraoxaspiro[5.5]-undecane, and 3,9-bis(2-hydroxy-1, 1-dipropylethyl)-2,4,8,10-tetraoxaspiro[5.5]undecane.

Aromatic dihydroxy compounds that can be used in the present invention are suitably selected from the group consisting of bisphenols having structure,

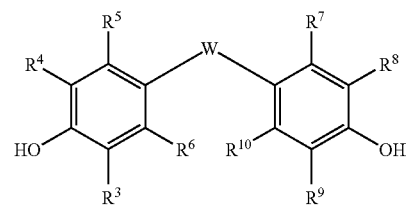

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

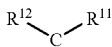

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure

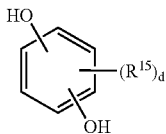

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures

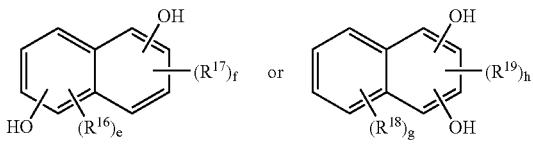

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene. Other suitable dihydroxy naphthalenes IV are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of monomers are selected based on the desired composition of the oligomers. If other comonomers are used, they can be introduced to the melt reaction system as part of the same feed, in a separate feed, or both.

The polycarbonate formed from these monomers may be a homopolymer, a random copolymer, or a random block copolymer. To form random block copolymers, preformed oligomer or polymer blocks with appropriate end groups (diols, diacids, diesters, etc) are used as co-reactants in the polymerization process.

Preferred dihydroxy compounds and combinations of dihydroxy compounds for use in the present invention include BPA, hydroquinone, and sulfones such as 4,4'-biphenyl sulfone.

B. Activated Carbonate

As used herein the term "activated carbonate" is defined as a diarylcarbonate which is more reactive than diphenyl carbonate toward transesterification reactions. Such activated carbonates are of the general formula:

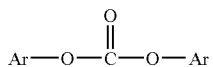

wherein Ar is a substituted aromatic radical having 6 to 30 carbon atoms. The preferred activated carbonates have the more specific general formula:

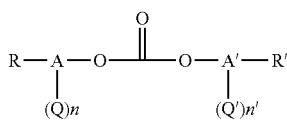

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein n+n' is greater than or equal to 1. R and R' are each independently substituent groups such as alkyl, substituted alkyl, cycloalkyl, alkoxy, aryl, alkylaryl having from 1 to 30 carbon atoms, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups with structures indicated below:

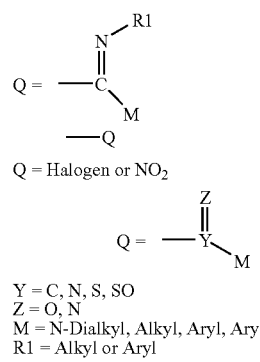

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl) carbonate. Unsymmetrical combinations of these structures, where the substitution number and type on A and A' are different, are also possible to employ in the current invention. A preferred structure for an activated carbonate is an ester-substituted diarylcarbonate having the structure:

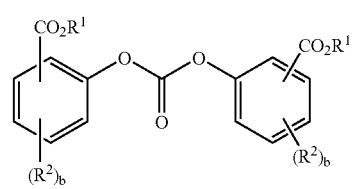

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4.

At least one of the substituents $CO_2R^1$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically bis(methylsalicyl)carbonate is preferred for use in melt polycarbonate synthesis due to its preparation from less expensive raw materials, lower molecular weight and higher vapor pressure.

One method for determining whether a certain diarylcarbonate is activated or is not activated is to carry out a model transesterification reaction between the certain diarylcarbonate with a phenol such as para-cumyl phenol. This phenol is preferred because it possesses only one reactive site, possesses a low of volatility and possesses a similar reactivity to bisphenol-A. The model transesterification reaction was carried out at temperatures above the melting points of the certain diarylcarbonate and para-cumyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. And a preferred reaction temperature is 200 C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-known detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses an equilibrium constant of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diarylcarbonate.

Some non-limiting examples of non-activating groups which, when present in an ortho position relative to the carbonate group, would not be expected to result in activated carbonates are alkyl and cycolalkyl. Some specific and non-limiting examples of non-activated carbonates are bis(o-methylphenyl)carbonate, bis(p-cumylphenyl)carbonate, and bis (p-(1,1,3,3-tetramethyl)butylphenyl)carbonate.
Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

A preferred ester-substituted diaryl carbonate is BMSC. Other preferred ester-substituted diaryl carbonates include bis-ethyl salicyl carbonate, bis-propyl salicyl carbonate, bis-phenyl salicyl carbonate and bis-benzyl salicyl carbonate.

C. Transesterification Catalysts

The method of the invention also comprises the step of introducing a catalyst to the melt reaction system to initiate a polymerization reaction. The catalyst may be introduced continuously, or may be introduced batchwise and may occur before, during or after the introduction of the dihydroxy composition or the activated carbonate to the melt react system.

The catalyst used in the method of the present invention is a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between about $10^{-5}$ and about $10^{-8}$ moles alkaline earth or alkali metal ion per mole of dihydroxy compound employed.

The quaternary ammonium compound is selected from the group of organic ammonium compounds having the structure

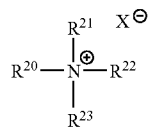

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having the structure:

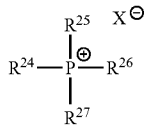

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the above structures are properly balanced. For example, where $R^{20}$-$R^{23}$ in structure VI are each methyl groups and $X^-$ is carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

In order to achieve the formation of polycarbonate using the method of the present invention an effective amount of catalyst must be employed. The amount of catalyst employed is typically based upon the total number of moles of the total dihydroxy compounds employed in the polymerization reaction. When referring to the ratio of catalyst, for example phosphonium salt VII, to all dihydroxy compounds employed in the polymerization reaction, it is convenient to refer to moles of phosphonium salt per mole of the first and second dihydroxy compounds combined, meaning the number of moles of phosphonium salt divided by the sum of the moles of each individual dihydroxy compound present in the reaction mixture. The amount of organic ammonium or phosphonium salts employed typically will be in a range between about $1\times10^{-2}$ and about $1\times10^{-5}$, preferably between about $1\times10^{-3}$ and about $1\times10^{-4}$ moles per mole of the dihydroxy compounds combined. The inorganic metal hydroxide catalyst typically will be used in an amount corresponding to between about $1\times10^{-4}$ and about $1\times10^{-8}$, preferably $1\times10^{-4}$ and about $1\times10^{-7}$ moles of metal hydroxide per mole of the dihydroxy compounds combined.

D. Diacids and Diesters

If the method of the invention is used to make a poly(carbonate-co-ester), a diacid or diester is also included in the transesterification reaction. Specific examples of diacids and diesters that can be used in the method of the invention include without limitation: aromatic diacids such as 2,6-nathalene dicarboxylic acid, aliphatic diacids such as succinic acid, or a cycloaliphatic diacid such as 1,7-cyclododecanedioic acid. The diacid employed may have structure:

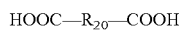

HOOC—$R_{20}$—COOH wherein $R_{20}$ is a $C_4$-$C_{30}$ aromatic radical, a $C_1$-$C_{40}$ aliphatic radical, or a $C_5$-$C_{30}$ cycloaliphatic radical. Specific examples of diacids of this formula include terephthalic acid; isophthalic acid; 1,4-cyclohexanediacrboxylic acid; hexanedioic acid; octanedioic acid; decanedioic acid; dodecanedioic acid; tetradecanedioic acid; hexadecanedioic acid; octadecanedioic acid; cis 9-octenedioic acid; alpha-nonyldecanedioic acid; alpha-octylundecanedioic acid; and hydrogenated dimer acid. Ester of these acids, for example lower alkyl esters such as methyl or ethyl esters may also be used.

Preferred diacids and diesters for use in the present invention include: terephthalic acid or esters thereof and isophthalic acid or esters thereof.

Formation of Polycarbonate

Figure 2:
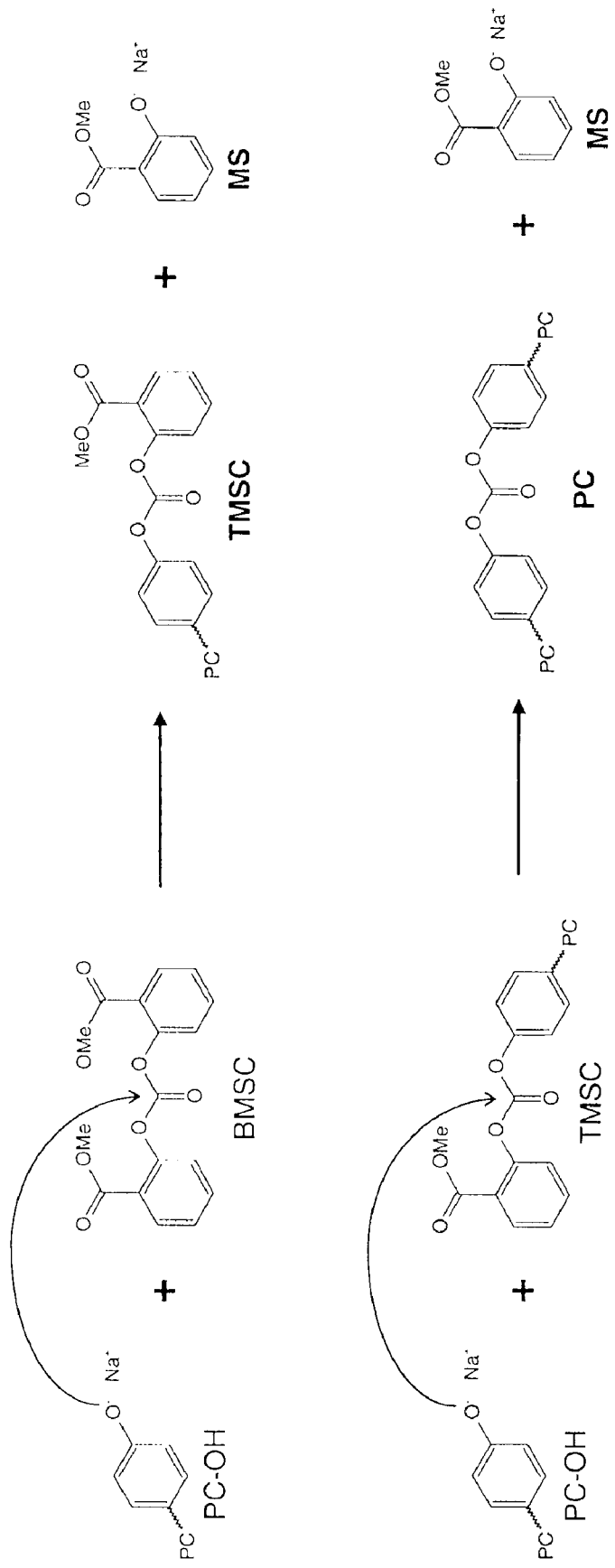
FIG. 2 shows the normal desired reaction in the production of polycarbonate using a dihydroxy compound and BMSC as the ester-substituted diaryl carbonate.

FIG. 2 shows the normal reaction in the production of polycarbonate using a dihydroxy compound and BMSC as the ester-substituted diaryl carbonate. In the first step, the —OH (or $O^-$) end group on a monomer or polycarbonate oligomer or polymer chain (PC—OH) reacts with BMSC to form a monomer, oligomer or polycarbonate terminated with a terminal methyl salicyl carbonate (TMSC) and methyl salicylate (MS). The PC-TMSC molecule in turn reacts with the —OH (or $O^-$) end group of another monomer or a growing oligomer or polymer chain to form polycarbonate PC and another molecule of methyl salicylate. Note that the other end group of the PC in this reaction is not specified and thus it can also be a site for additional chain extension. Thus, the reaction shown in FIG. 2 is not a chain-growth terminating event, unless the unspecified ends of the PC—OH are capped.

FIGS. 3A and B show side reactions through which by-products can occur during the process of FIG. 2. In FIG. 3A, the by-product MS reacts with a terminal —OH or $O^-$ to yield a polymer with a salicylate end group (Sal-OH) and methanol. In FIG. 3B, the product of the reaction from FIG. 3A reacts with BMSC to form a TMSC group with an internal salicylate residue (ISC-TMSC). Sal-OH can also react with the intermediate TMSC product of FIG. 2 to form polycarbonate with internal salicylate structures (ISC).

Figure 4:
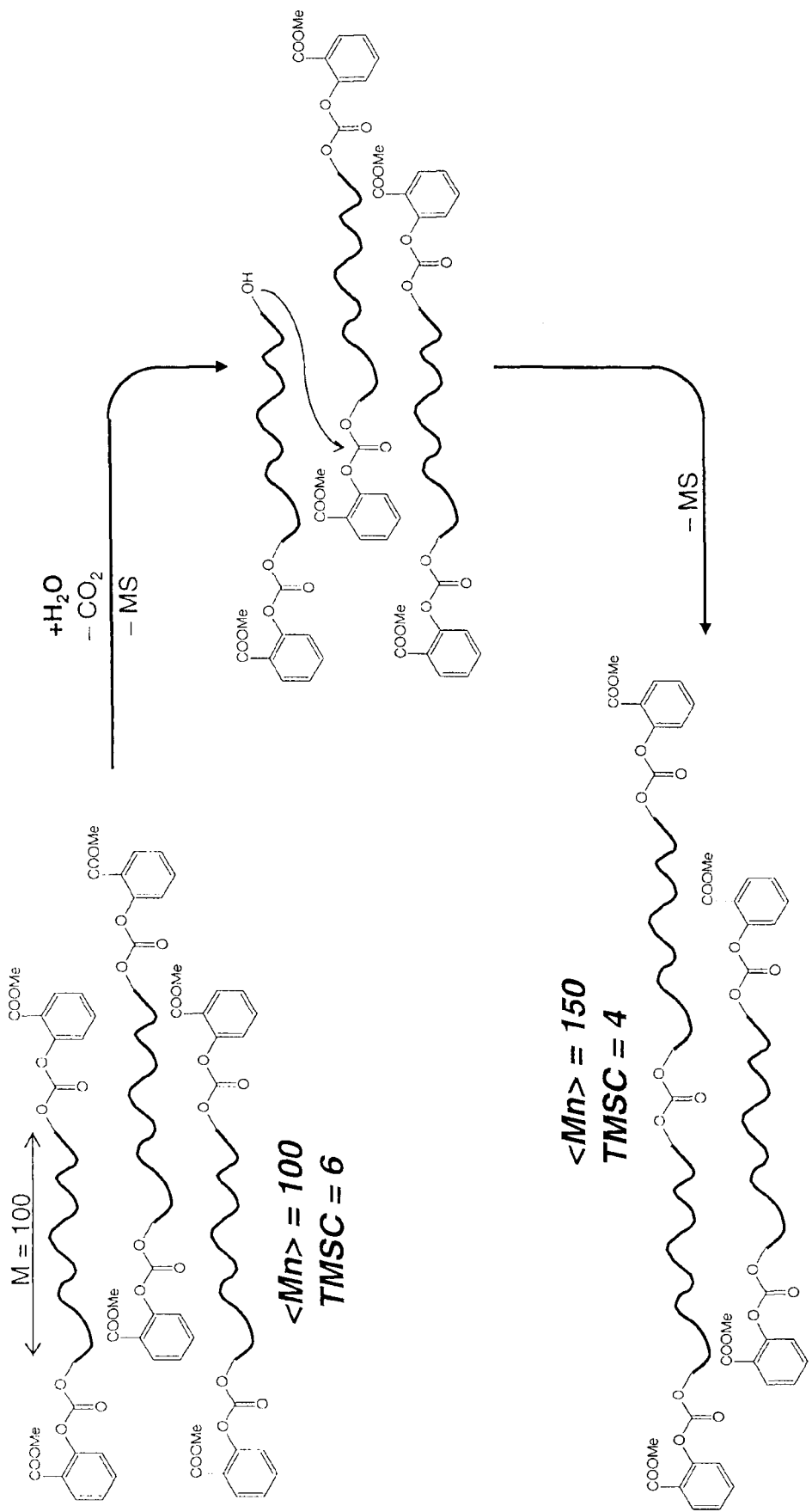
FIG. 4 shows the reaction of polymers with TMSC end groups can react to form polymers with greater molecular weight.

In addition to the reaction shown in FIG. 2, TMSC can also react with another TMSC to form longer chains and methyl salicylate shown in FIG. 4. This reaction occurs particularly under hydrolyzing conditions, such as when a polycarbonate it molded at elevated temperature, and results in changes in properties and release of volatiles. Such changes are generally undesirable. While not intending to be bound by any particular mechanism, this is believed to be a result of the hydrolytic degradation of the ester bond of the internal salicyl carbonate group (ISC) and consequent chain scission and molecular weight reduction. In addition, it should be noted such hydrolysis or other reactions leading to the loss of carbonate groups may also occur due to the presence of water and/or alcohol(s) during the oligomerization and/or polymerization processes to prepare the polycarbonate. Such reactions may result from various causes. For example, the transesterification catalyst added to the reaction may be contained in a water and/or alcoholic based solvent system, one or more of the monomers used may contain water and/or alcoholic impurities, or the gas contained in the overhead space of the reactors may contain low levels of water. The net effect of the presence of such impurities will be to change the effective stoichiometry of the raw material formulation to one that is "poorer" in carbonate species relative to diol species. In extreme cases, the addition of sufficient amounts of water and/or alcohol may cause a process for preparing a polycarbonate to change from a "normal" ratio one to a reverse ratio process. In general though, one skilled in the art will appreciate that it is generally desirable to minimize and correct for any such changes in stoichiometry during the process to prepare the polymer. For example, this change in reaction stoichiometry may be minimized by using very pure and dry monomers and gases and also minimizing the addition of any water added as part of the catalyst system.

The present application provides methods for making polycarbonates that decreases the number of chains terminated with alkyl salicyl carbonates. This results in a reduction in both the content of internal salicyl carbonate groups and their ester linkages and in the amount of terminal alkyl salicylate carbonate (TASC) end groups in the final product. Prior to Applicants efforts as described herein, it was not appreciated that internal salicyl cabronate and its ester linkages or TASC end groups were detrimental. In fact, U.S. Pat. Nos. 5,696,222, 6,252,036 and 6,303,734 disclose the intentional creation of terminal methyl salicyl carbonate (TMSC) endgroups to take advantage of the greater reactivity of BMSC, for example, as compared to diphenyl carbonate (DPC).

Reverse-Ratio Method of Making Polycarbonate

The method of the present invention provides a method for making polycarbonate comprising reacting a dihydroxy reaction component that comprises at least one dihydroxy compound with a carbonate reaction component that comprises at least one activated diaryl carbonate in the presence of an esterification catalyst to produce a polycarbonate, wherein (a) the activated diaryl carbonate is an ester-substituted diaryl carbonate, and (b) wherein the mole ratio of the carbonate reaction component to dihydroxy reaction component is less than 1, for example 0.996 or less. In specific embodiments, the ratio is between 0.962 and 0.996, for example between 0.968 and 0.996. In another specific embodiment, the ratio is between 0.971 and 0.994.

The method of the invention can also be used to make poly(carbonate-co-esters) through the inclusion of diesters or diacids. One skilled in the art will recognize that the presence of these additional components needs to be taken into account when calculating the stoichiometric ratio of diaryl carbonate to dihydroxy compound. For example, one mole of diester will generally substitute for one mole of diaryl carbonate in the ratio calculation, whereas one mole of diacid will generally substitute for one mole of dihydroxy compound. As discussed in more detail in another section, one skilled in the art will understand that the substitution may not be exactly 1 to 1, and it may depend slightly on such factors as the degree of monomer purity and volatility of the monomer (e.g. is a monomer actual partially lost due to devolatization during the process). In addition, a non-activated diester may have so much slower reactivity than an activated carbonate that it might actually act to some extent as a chain stopper or even inert component under some process conditions.

In addition, some small amount of non-activated carbonate or unsymmetrical diaryl carbonates having one activated aryl group may be substituted for the activated carbonate in the calculation of the stoichiometric ratio. However the reactivity of such carbonates will be slower than those of the activated carbonates. Therefore although they would not affect the stoichiometric ratio of the reaction and thus the end group type and molecular weight at full conversion, in practice their reduced reaction kinetics may actually cause them to act to some extent as chainstoppers or inert components in this process.

The method of reaction may be performed using any known transesterification reaction protocol, including without limitation melt transesterification (also known as melt condensation) and solid state polymerization. The melt reaction may be done in a reactor train, an extruder or reactor/train combination and in a continuous, semi-continuous or batch process. The polymerization may conveniently be carried out in a two stage process, namely oligomerization followed by polymerization. It may be desirable to limit exposure of the reactants to high temperatures and long holding times in any monomer melt-up, monomer melt mixing or oligomerization stages. Further, it is advantageous during the polymerization to effectively devolatize residual materials such as MS. By way of example, melt transesterification processes are described in U.S. Pat. Nos. 5,026,817, 5,221,761, 5,412,061 and 6,569,985; and solid state polymerization processes are described in U.S. Pat. Nos. 6,960,641 and 6,518,391.

In a melt process in accordance with the invention, the dihydroxy compounds or polycarbonate oligomers are reacted with the ester-substituted diaryl carbonate. The melt process generally involves a base-catalyzed condensation polymerization of, for example, diphenyl carbonate and a dihydroxy compound such as Bisphenol A. The reaction is conducted at high enough temperatures for the starting monomers and product to remain molten, while the reactor pressure is staged in order to effectively remove the ester-substituted phenol, the by-product of the polycondensation reaction. Most current melt technology programs employ a two component catalyst system. The first component is a tetralkylammonium hydroxide (TMAH) co-catalyst which is used to initiate oligomer formation in the melt. The second catalyst is an alkali metal hydroxide (i.e., the "α-catalyst") which is the second part of the overall catalyst system. Due to its intrinsic thermal stability and low volatility, the alkali metal salt must be quenched at the end of the polymerization using this catalyst.

In a solid state polymerization process, a precursor polycarbonate, typically a relatively low molecular weight oligomeric polycarbonate, is prepared by the melt reaction of a diaryl carbonate such as diphenyl carbonate with a dihydroxy compound such as bisphenol A. In the preparation of bisphenol A polycarbonate oligomers, a diaryl carbonate such as diphenyl carbonate is heated together with bisphenol A in the presence of a catalyst such as sodium hydroxide while removing phenol. Phenol is formed as a by-product of the transesterification reaction between phenolic groups of the growing polymer chains and diphenyl carbonate or phenyl carbonate polymer chain end-groups. In the oligomer preparation, either an excess of diaryl carbonate or an excess of dihydroxy compound may be employed. This oligomerization reaction is typically carried out under reduced pressure to facilitate the orderly removal of the phenol by-product. When the desired level of oligomerization has been achieved the reaction is terminated and the product oligomeric polycarbonate is isolated. The oligomeric polycarbonate so produced is amorphous and must be partially crystallized in order to be suitable for solid state polymerization.

The oligomeric polycarbonate may be partially crystallized by one of several methods, such as exposure of powdered or pelletized oligomer to hot solvent vapors, or dissolution of the amorphous oligomer in a solvent such as methylene chloride and thereafter adding a solvent such as methanol or ethyl acetate to precipitate crystalline oligomeric polycarbonate. Typically, such solvent vapor or liquid solvent crystallization methods result in partially crystalline oligomeric polycarbonates having a percent crystallinity between about 20 and about 40 percent as measured by differential scanning calorimetry. A percent crystallinity in this range is usually sufficient for the oligomeric polycarbonate to undergo solid state polymerization without fusion of the pellets or powder being subjected to SSP. In addition to solvent induced crystallization, oligomeric bisphenol A polycarbonate has been crystallized by dissolving BMSC or other activated carbonate in molten amorphous polycarbonate oligomer followed by cooling the mixture to ambient temperature to afford partially crystalline polycarbonate as a mixture with BMSC or other activated carbonate. Finally, amorphous oligomeric polycarbonates have been crystallized by prolonged heating at a temperature below the melting point of the partially crystalline polycarbonate. However, such thermally induced crystallization is quite slow relative to the aforementioned crystallization methods. In the method of the invention, an understoichiometric amount of BMSC or other activated carbonate is used in preparing the polymer. Therefore either polycarbonate oligomers having free OH end groups are reacted with an understoichiometric amount of BMSC or other activated carbonate in the SSP stage, or else polycarbonate oligomers having carbonate end groups are reacted with bisphenol A or another dihydroxy compound having OH end groups in the SSP stage.

The partially crystalline oligomeric polycarbonate in a solid form such as a powder, particulate or pellet is then heated under solid state polymerization conditions at a temperature below the sticking temperature or melting point of the oligomeric polycarbonate, but above the glass transition temperature of the partially crystalline oligomeric polycarbonate, and the volatile by-products formed as chain growth occurs, phenol, diphenyl carbonate and the like, are removed. The polycondensation reaction which converts the low molecular weight oligomer to high polymer is effected in the solid state under these conditions.

The polymerization can utilize any known catalyst, including without limitation those in the list set forth above. In certain embodiments, the catalyst is a two part catalyst system such as tetramethylammonium hydroxide (TMAH)/sodium hydroxide. In this case, the levels of the alpha catalyst (typically sodium) is suitably used at a concentration of 1 to 40 mEq/mol of total dihydroxy compound, for example between 2 and 20 mEq/mol, or between 4 and 10 mEq/mol.

The method is carried out at a "reverse ratio" with respect to conventional stoichiometry. Thus, in this embodiment of the invention, the dihydroxy compound is present in a molar excess relative to the ester-substituted diaryl carbonate. Stated differently, the molar ratio of ester-substituted diaryl carbonate to dihydroxy compound is less than 1, when considered to an accuracy of three decimal places. For example, the molar ratio is suitably 0.996 or less. In specific embodiments, the ratio is between 0.962 and 0.996, for example between 0.968 and 0.996. In another specific embodiment, the ratio is between 0.971 and 0.994.

In the art, the molar ratio of ester-substituted diaryl carbonate to dihydroxy compound has conventionally been close to, but always slightly greater than 1. Surprisingly, as demonstrated in the examples below, although the numerical difference in the ratios of the present invention are not great as compared to these early examples, the use of the reverse ratio of less than 1 results in a significant decrease in the amount of TMSC in the product polymer and thus achieves the goal of the present invention.

Determination of Mol % End Groups

As noted above, the term "end groups" refers to the terminal groups on the ends of chains of the polycarbonate. The mol % of an end-group or type of end-group is expressed as a mole percentage of the total amount of dihydroxy compound incorporated in the polymer. There are several ways of measuring this quantity. For example, end groups may be analyzed by either spectroscopic means or by total hydrolysis of a polymer followed by analysis of the various constituent units. Spectroscopic methods include vibrational spectroscopy such as infrared or Raman spectroscopy and nuclear magnetic resonance (NMR) spectroscopy. Such methods and their application to the qualitative and quantitative analysis of polymers are described in more detail in Spectroscopy of Polymers by J. Koenig (ISBN 0-8412-1904-4) and Modern Polymer Spectroscopy by G. Zerbi (ISBN 3527296557), both of which are hereby incorporated by reference.

Of these methods, NMR spectroscopy is the preferred one because it allows an unambiguous structural assignment. It will be understood by one skilled in the art that the NMR resonances in an NMR spectrum may be assigned to specific structural features of a polymer by using one or more methods including: comparison of the observed chemical shifts with those observed for analogous low-molecular weight model compounds, calculation of chemical shifts by using derived additivity relationships (particularly for $^{13}C$ NMR), synthesis of polymers with known specific structural or compositional features to establish the particular resonance-structure relationships, synthesis of polymers with selectively enriched $^{13}C$ sites or having deuterium selectively substituted for protons, comparison of the intensities of structural sequences with those intensities predicted based on models of the polymerization kinetics and statistical distributions, various 1-dimensional (1-D) spectral-editing methods such as the selective-spin-decoupling used for the determination of the proton bonding of carbon atoms, and various two-dimensional (2-D) techniques for determining the coupling between nuclei and to reveal the chemical shifts of the nuclei. The chemical bonding between the various constituent atoms can often be inferred from the $^1H$ and $^{13}C$ chemical shifts and from the spin-spin coupling between nuclei. One skilled in the art will understand that each of these techniques has their limitations and that it is often necessary to use a combination of these techniques, as well as other physical and chemical methods as needed.

If the polymer is soluble, high-resolution solution NMR spectra can generally be obtained. Because high polymer solution viscosities may shorten relaxation times and thus broaden line widths, one skilled in the art will understand that various standard methods may be applied to obtain high-resolution NMR spectra, for example, the polymer solution may be diluted or the measurement temperature increased, or a higher magnetic field strength may be applied. One skilled in the art will appreciate that the choice of solvent is important. Preferred solvents will be magnetically isotropic and will be inert and therefore not interact strongly with the polymer (e.g. no hydrogen-bonding interactions between the solvent and the polymer and no degradation of the polymer by the solvent). In addition preferred solvents will not contain functional groups that blank out regions of the NMR spectrum. Preferred solvents will include deuterated chloroform ($CDCl_3$), and the deuterated form of tetrachloroethane. If necessary the deuterated form of other solvents such as dimethyl sulfoxide, benzene, pyridine, acetone, and dioxane may also be used if they do not interact strongly with the polymer or degrade it. In the case of $^{13}C$ NMR spectra, additives such as Chromium (III) acetylacetonate (also known as chromium (III) pentanedionate or Cracac) may be used to reduce both the T1-relaxation times and the Nuclear Overhauser Effect (NOE).

If the polymer is not soluble, various methods well-known in the art may be applied in order to obtain a high resolution, narrow linewidths, and enhanced sensitivity in solid-state NMR polymer spectra. For example, one skilled in the art will appreciate that the techniques of high-power decoupling (DD), magic angle spinning (MAS), and cross-polarization (CP) may be applied. One skilled in the art will appreciate that solution NMR methods will be greatly preferred for quantitative analysis whenever possible.

These and all of the other various aspects in obtaining and interpreting NMR spectra of polymers are described in more detail in NMR Spectroscopy of Polymers, Edited by R. N. Ibbett (ISBN 075140005X), NMR Spectra of Polymers and Polymer Additives by A. J. Brandolini and D. D. Hills (ISBN 0824789709), NMR Spectroscopy of Polymers by K. Hatada and T. Kitayama (ISBN 3540402209), and Instrumental Analysis by G. D. Christian and J. E. O'Reilly (ISBN 0-205-08640-3), all of which are hereby incorporated by reference.

In the NMR analysis of end group type and content, both $^1$H-NMR and $^{13}$C-NMR may be employed, but $^1$H-NMR is preferred because of its greater sensitivity and ease of use for quantitative analysis. When the identity of all of the dihydroxy compound and the composition of the polymer are known and all of the dihydroxy compounds contain at least one proton that is distinct and distinguishable in the proton NMR spectrum from those of the other dihydroxy compounds as well as the various end groups, one may then readily use the integrated resonances of the various end group and dihydroxy units in the $^1$H-NMR in order to calculate the molar amount of each end group type present. For example, in the case of the BPA polycarbonate homopolymer, one may simply measure the integrated intensity of each end group type relative to that of the incorporated BPA unit. One skilled in the art will recognize the need for the use of either an internal standard for the quantitative analysis or the use of a chemometric software calibration program. In addition, one skilled in the art will understand that various standard corrections may need to be applied in this analysis, for example, correcting for any differences in the relative number of protons whose intensities have been integrated for each type of structural unit.

| Functional Group | Typical $^1$H-NMR assignment (ppm) |
| --- | --- |
| total Terminal Salicylate | 8.03/8.05(2J=7Hz, doublet, 1 proton) Methylester group at 3.85ppm |
| total Internal Salicylate | 8.20/8.22(2J=7Hz, d, 1H) |
| BPA - Salicyl-OH endgroup | 10.48(CDCl3, OH, s, 1H) 10.38(TCE, OH, s, 1H) 8.03/8.05(2J=7Hz, d, 1H) |
| MeHQ - Salicyl-OH endgroup | 10.33(TCE, OH, d, 1H) 8.03/8.05(2J=7Hz, d, 1H) |
| HQ - Salicyl-OH endgroup | 10.36(CDCl3, OH, d, 1H) 10.31(TCE, OH, d, 1H) 8.03/8.05(2J=7Hz, d) |
| RS - Salicyl-OH endgroup | 10.33(CDCle, OH, d, 1H) 8.03/8.05(2J=7Hz, d, 1H) |
| total Methyl Carbonate | 3.87(CH3O s, 3H) |
| total Methyl Ether | 3.76(CH3O s, 3H) |
| Residual BMSC | 8.01/8.03(2J=7Hz, d) |
| Residual MS | 10.73(OH, s) 7.80/7.82(2J=7Hz, d) |
| Linear Fries | 8.00(3J=3Hz, d) 10.42(OH, s) |
| Acid Fries | 7.75(3J=3Hz, d) |
| Branched Fries | 8.13(3J=3Hz, d) |
| PC-OH | 6.63/6.65(2J=7Hz, d) |

When the polymer to be analyzed contains "mer" or monomer repeat units (from incorporated dihydroxy compounds) that do not have distinguishable protons or the copolymer composition is not known, $^{13}$C-NMR may be applied. In this case the content of a particular end group on a mole percent basis may be determined by measuring the integrated area of the resonance for a particular end group type relative to that of the carbon of the carbonate group in the polymer backbone. One skilled in the art will understand that one would measure the amount of the end group relative to take the sum of the carbonate and incorporated diacid units in the case of poly (carbonate-co-ester)s. One skilled in the art will also appreciate that a small correction may need to be made in order to correct for the small difference in number of carbonate and incorporated dihydroxy monomer units in the polycarbonate due to the molar stoichiometry of the monomers and the resulting end group effects. In addition, the NMR method will not always readily distinguish between functional groups in the polymer versus those in some residual species. One skilled in the art will understand that in this case, residual analyses may be conducted and then a correction to the NMR data can be made. Alternatively the polymer may be purified, for example, by precipitation to remove any residual species prior to NMR analysis.

Polycarbonate of the Invention

Although the polycarbonate made using the method of the present invention is generally suitable for use in the same applications as polycarbonates containing comparable monomers made by previously known methods, it is in fact a different material when the trace components are considered. The differences in trace components make it a superior material in many respects.

The polycarbonate made by the method of the invention is structurally different from prior compositions made using ester-substituted activated carbonates with a stoichiometric ratio of greater than 1, because all of these polymers may be understood to contain high levels of terminal carbonate groups derived from the ester-substituted diaryl carbonate and internal salicylate linkages.

The polycarbonate made by the method of the invention is structurally different from polycarbonates made by the use of ester-substituted diaryl carbonates to end-cap or polymerize polycarbonate prepared using a diphenyl carbonate. This process is characterized by the formation of substantial levels of Fries rearrangement products, whereas the polycarbonate formed by the method of the present invention has low levels of Fries.

Therefore, a further aspect of the invention is a polycarbonate having both low levels of terminal ester-substituted carbonate end groups, for example less that 0.5 mole %, and low levels of Fries rearrangement products, for example less than 1000 ppm. Further, the polycarbonates of the invention contain low levels of residual free salicylates, for example from 1 to 500 ppm, more preferably from 1 to 100 ppm. The polycarbonate of the invention composition is suited to molding applications, because it retains transparency without discoloring when subjected to elevated molding temperatures.

In certain embodiments, the polycarbonate of the invention contains less than 500 ppm of Fries rearrangement products, for example less than 300 ppm, less than 200 ppm or less than 100 ppm.

One method to characterize Fries rearrangement products is by means of proton NMR. The Fries structures characterized in this analysis include:

Linear Fries:

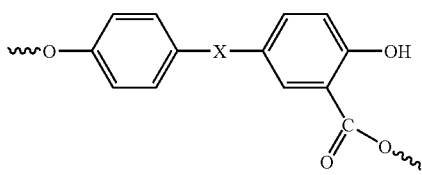

Acid Fries:

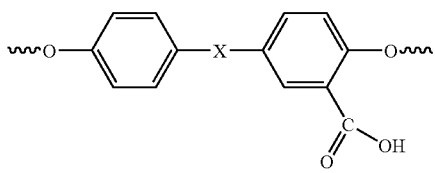

Branched Fries:

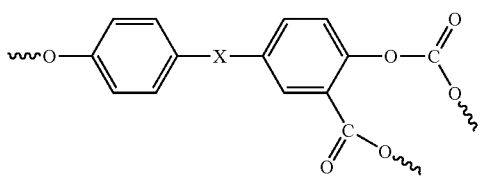

wherein X represents, for example, one of the groups of formula:

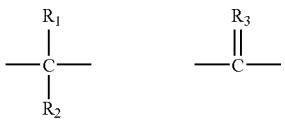

wherein $R_1$ and $R_2$ each independently represent a hydrogen atom or a monovalent linear or cyclic hydrocarbon group and $R_3$ is a divalent hydrocarbon group. In certain embodiments, the polycarbonate of the invention contains less than 0.25 mol % of terminal ester-substituted carbonate end groups, for example less than 0.2 mol %, or less than 0.1 mol %. As described above, the amount of terminal ester-substituted carbonate end groups can be maintained at these levels by using a stoichiometric ratio of less than 1.

In certain embodiments of the invention, the polycarbonate has a number average molecular weight, Mn, measured relative to PS of between 10,000 g/mol and 160,000 g/mol, for example between 13,000 g/mol and 130,000 g/mol, or between 15,000 g/mol and 102,000 g/mol. Obtaining the desired molecular weight for a given application can result through selection of the time, temperature and pressure profile of the reaction, chainstopping monofunctional phenols or the selection of catalyst type and concentration as is conventional in the art. In addition, when using a ester-substituted diaryl carbonate in the reaction, the ratio of the monomers has an impact on the molecular weight obtained. To achieve a higher molecular weight in the "reverse ration" process, the mole ratio of ester-substituted diaryl carbonate to the sum of the dihydroxy compound and ½ the chainstopping monofunctional phenol should be greater than 0.962 in one embodiment or greater than 0.971 in a second embodiment. The final molecular weight however can be affected by side reactions and impurities in the monomers. For example, many catalysts are water soluble and added to the polymerization reaction mixture in aqueous solution. This small amount of added water may then hydrolyze some of the ester-substituted diaryl carbonate or terminal alkyl salicyl carbonate groups of the form oligomer or polymer, this reducing the effective molar ratio of carbonate to hydroxy end groups in the reaction. Side reactions typically lead to end-capping and hence lower molecular weight than calculated from the theoretical stoichiometry. To understand the effect of impurities in the monomers one has to look at the impurities in the DAC and the dihydroxy compound.

For example BMSC may contain some unreacted monomer which will effectively lower the actual amount of reactive BMSC. This lowers the actual ratio which will lead to lower molecular weight. In the case of BPA most of the impurities are other dihydroxy compounds such as ortho, para BPA and a small amount of monohydroxy compounds such as phenol and chroman. The dihydroxy compounds will typically react the same way as BPA and will have no impact on the monomer ratio. The monohydroxy compounds may again act as end-cap and thereby lower the molecular weight. Hence it is clear that typical impurities tend to lower the actual molecular weight. The inventors have experienced this as well. In practice, using a ratio of 0.95 will only allow making polycarbonate with a number average molecular weight of around 5000-6000. A ratio of 0.962 allows molecular weight of 8000 to 10000.

In certain embodiments of the invention, the amount of residual free salicylate is less 400 ppm, for example less than 300 ppm or less than 200 ppm. The amount of free salicylate is controlled by the devolatilization process employed. Typically, this process occurs in a devolatilizing reactive extrusion step. Higher temperatures, longer residence times and better vacuum in the extruder favor devolatilization. Alternatively, higher catalyst levels drive the polymerization to completion earlier, so that more of the extruder length and residence time can be used for devolatilization as opposed to polymerization. The efficiency of the screw design may also improve devolatilization by creating a greater surface area of the polymer to be devolatized.

The invention will now be further described with references to the following non-limiting examples.

The molecular weight measurements of the materials prepared in the examples have been carried out by means of Gel Permeation Chromatography (GPC). A 12-point calibration line covering the entire molecular weight range of was constructed using polystyrene standards with a narrow molecular weight distribution (polydispersity (PD) of less than 1.01). All polycarbonate samples were measured against the calibration curve and molecular weights were expressed relative to the measured polystyrene molecular weights. Polycarbonate BPA homopolymer oligomers and polymers were dissolved in chloroform solvent prior to measurement, and the terpolymer oligomers and polymers were dissolved instead in a mixed solvent (15/85 vol/vol) of hexafluoroisopropanol (HFIP) and chloroform. For both the homopolymer and terpolymer samples the mobile phase was a mixed solvent (5/95 vol/vol) of HFIP in chloroform. Because further changes in molecular weight may sometimes occur in solution depending on the nature of the polymer and the solvent, it is important to carry out the GPC analysis rapidly after a good solution of polycarbonate in a good solvent and strong eluent is obtained and before any degradation of the polycarbonate occurs. Therefore all of the terpolymer GPC measurements were carried out within two hours of preparing the terpolymer solutions. The temperature of the gel permeation columns was 35° C.

It will be appreciated by one skilled in the art that the analysis of other polycarbonate homopolymers and copolymers may necessitate the use of variations in other polymer concentrations, polystyrene molecular weight standards, solvent systems, dissolution methods, eluents/mobile phases, stationary phases (composition; crosslinking, porosity, surface functionalization), detector systems (such as those based on refractive index or UV or infrared absorption) and instrumental parameters (flow rate, temperature, and pressure). For example, the mobile phase should be a good solvent for the polymer, not interfere with the detector response of the polymer, and should wet the surface of the stationary phase (column packing) well. Since the GPC method is quite sensitive to the hydrodynamic volume of the polymer chain, polymer-solvent interactions may have a significant influence on the retention times measured. In addition, for the measurement of some copolymers, it may be necessary to use multiple detector systems. Care must be taken to avoid reaction between the solute (polymer) and the stationary phase or any other adsorption phenomena. Such care may be especially important when two solvents are used, one to dissolve the polymer and the other as eluent. Changing over the solvent system in the chromatograph may also take long periods of time of 24 hours or more before the baseline stabilizes. Such aspects of the GPC measurement method are discussed in Size Exclusion Chromatography by S. Mori and H. G. Barth (ISBN 3-540-65635-9), Chapter 18 of Polymer Synthesis and Characterization by S. R. Sandier, W. Karo, J. -A. Bonesteel, and E. M. Pierce (ISBN 0-12-618240-X), Chapter 3 of Introduction to Polymers by R. J. Young and P. A. Lovell (ISBN 0-412-30630-1), all three of which are incorporated here by reference. It will also be appreciated by one skilled in the art that some small variations in the retention times and thus the determined molecular weight may be observed based on variations in these various parameters in the GPC method.

It will be furthermore appreciated by one skilled in the art that the GPC method may not be universally applicable for the determination of polymer molecular weights or to determine whether one has obtained a "polycarbonate polymer" as used here. For example, some polymers may be insoluble due to very high molecular weights, their composition, crystallinity or branching. In such cases, it is possible by melt flow rate or melt viscosity measurements to determine whether one has obtained a "polycarbonate polymer" as used here.

Melt mass-flow rate (MFR) and melt volume-flow rate (MVR) of polycarbonates are measures of the extrusion rate of a polycarbonate melt through a die with a specified length and diameter under set conditions of temperature and loads. Such measurements are typically made according to ISO 1133, which is hereby incorporated by reference. These melt flow rate techniques are based on the principle that flow increases with decreasing polymer viscosity for a given temperature and load test condition. A higher MVR value indicates a lower viscosity under an applied stress (load or weight in kg) and generally decreases as the molecular weight of a particular type of polymer increases. The test temperature is usually set at or slightly above the melting region of the material being characterized. Melt viscosity is a measurement of the rheological characteristics of thermoplastics at temperatures and shear conditions common to processing equipment. Melt viscosities are typically determined by pressing a melt through a die while measuring the pressure drop over the complete or part of this die, and such measurements are typically conducted according to ISO 11443, which is hereby incorporated by reference. Zero shear rate viscosities may be determined by measuring the melt viscosity of a polymer at various shear rates and then extrapolating the data to a shear rate of zero. Melt viscosities generally increase as the molecular weight of a particular type of polymer increases. It is important to avoid degradation of the polymer in the melt flow rate or melt viscosity measurement. One skilled in the art will recognize that degradation of the polymer may be avoided by carefully drying the polymer prior to measurement to remove water and the careful selection of measurement parameters such as the measurement temperature and the use of an inert atmosphere, if needed. The importance of these various measurement parameters and their optimization in the melt flow rate and melt viscosity measurement methods are described in Rheology—Principles, Measurements and Applications by C. W. Macosko ISBN (0-471-18575-2), Rheological Techniques by R. W. Whorlow (ISBN 0-13-775370-5), Flow Properties of Polymer Melts by J. A. Brydson, (ISBN 0-59-205458-6), all three of which are hereby incorporated by reference. One skilled in the art may therefore determine if an insoluble sample is a "polycarbonate polymer" as used here by comparing the melt flow rate or melt viscosity at zero shear viscosity of the insoluble polymer with that of a polycarbonate BPA-based homopolymer having a molecular weight of at 10,000 g/mol when measured relative to polystyrene standards according to the GPC method. The insoluble sample is a "polycarbonate polymer" as used here, if it has a melt flow rate at least as low as that of the polycarbonate homopolymer or a melt viscosity at least as high as that of the polycarbonate homopolymer when measured under the same conditions (e.g. absolute temperature and mass).

EXAMPLE 1

Figure 5:
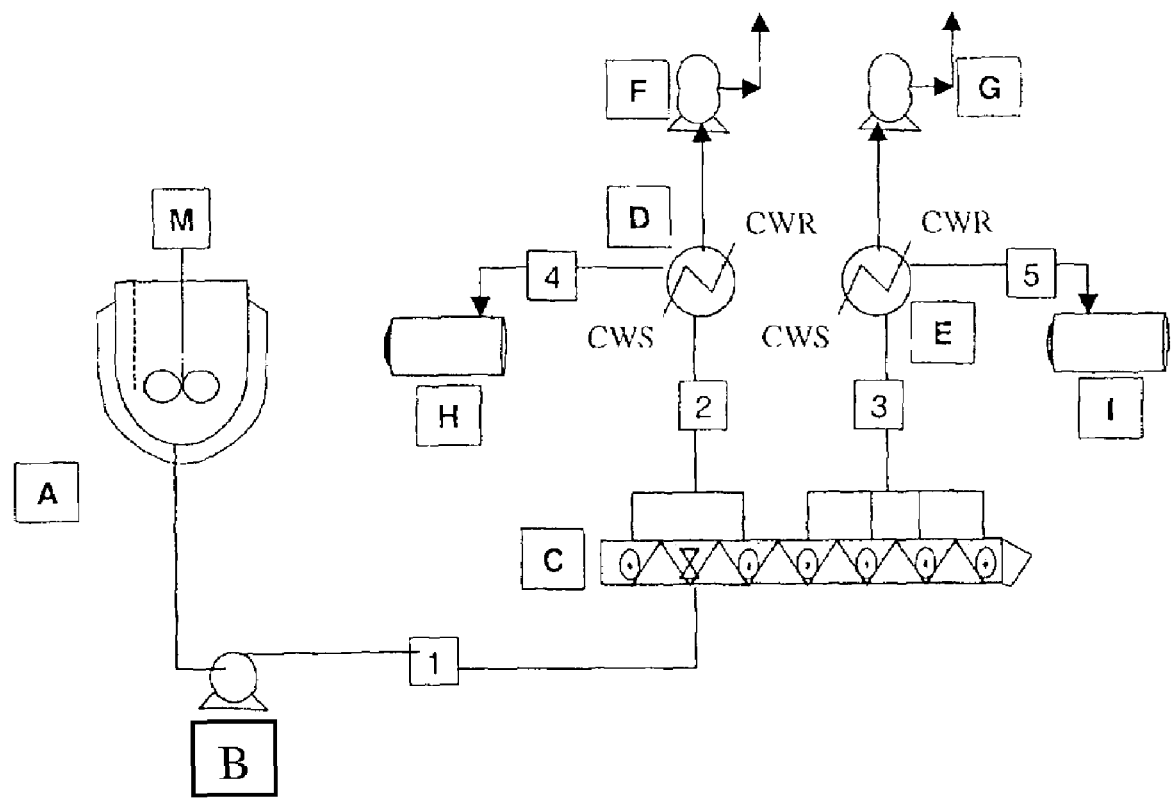
FIG. 5 shows an apparatus used in preparing the examples of the invention and comparative examples.

Polymerizations were carried out in the reactor system shown schematically in FIG. 5. In this system the oligomerization vessel A is charged at ambient temperature and pressure with solid dihydroxy compound monomers, bisphenol A, and optionally also hydroquinone, and methyl hydroquinone (terpolymers); solid BMSC. The mol % of monomers in the terpolymers was 33% BPA, 34% hydroquinone, and 33% methyl hydroquinone. The catalysts tetramethyl ammonium hydroxide and sodium hydroxide were next added as an aqueous solution—The tetramethyl ammonium hydroxide at a concentration of 25 µEq/mol diol and the sodium hydroxide at a concentration of 4 µEq/mol BPA in the case of homopolymer and 2 µEq/mol BPA in the case of terpolymer. After this the oligomerization reactor was sealed shut. The system was deoxygenated by briefly evacuating the oligomerization reactor and then introducing nitrogen. This deoxegenation process was repeated three times. The oligomerization reactor was then heated to a temperature of either 150 or 170° C. (Table 1). After a period of at least approximately 4 hours, an additional amount of sodium hydroxide was added to the molten oligomers at a concentration of 6 µEq/mol dihydroxy compound in the case of the terpolymer production runs.

TABLE 1

| Example | Polymer | Ratio | Molar Ratio BMSC/Aromatic Diols | Oligomerization T ° C. |
|---|---|---|---|---|
| WE 1 | HP | Reverse | 0.986 | 150 |
| CE 1 | HP | Normal | 1.021 | 170 |
| WE 2 | TP | Reverse | 0.986 | 170 |
| CE 2 | TP | Normal | 1.018 | 170 |

The molten oligomer was then fed to a ZSK-25 extruder C by means of pump B and feedline 1 (FIG. 5). The ZSK-25 extruder is a 25 mm diameter, twin screw, co-rotating intermeshing extruder having a length to diameter ratio (LOD) of about 59. The oligomer was fed to the extruder at a rate of about 12 to 14 kg/h, and the screw speed was about 300 rpm. The barrels of the extruder are set at 300 C, the die head at 310 C The Z-SK 25 extruder is equipped with a high and low vacuum system to remove the methyl salicylate formed as a byproduct in the polycondensation reaction. The low vacuum system consists of line 2, condenser D, Vacuum pump F and MS holding tank H. The high vacuum system consists of line 3, condenser E, Vacuum pump G and MS holding tank I. The two low vacuum vents are operated at a vacuum level of about 14 to 20 mbar, and the subsequent four high vacuum vents operated at a vacuum level of about 0.5 to 4 mbar. The extruder was operated under conditions of temperature, vacuum, residence time, and mixing intensity sufficient to promote polymerization. It should be noted that three production runs of the normal ratio homopolymer were made, the average values of these runs are reported whenever possible.

Molding of Polymers

The polycarbonate pellets were dried before molding. In all cases the same molding machine, an Engel 45T, and mold, an insert mold yielding a plaque of 60×60×2.5 mm, were used. In order to emphasize the differences in color performance between the polycarbonates and to test them under realistic but harsher conditions the molding conditions were selected such that the melt was exposed to a relatively high temperature in combination with a longer residence time in the barrel compared to regular molding. Details of these molding conditions for both the polymers are given in Table 2.

Characterization of Polymers

The molecular weight properties of the polymers were determined by gel permeation chromatographic (GPC) analysis, using polycarbonate molecular weight standards to construct a broad standard calibration curve against which polymer molecular weights were determined. The terpolymer (TP) values were corrected based on their lower average repeat unit mass versus that of BPA homopolymers.

The levels of terminal methyl salicylate carbonate (TMSC) and internal salicyl carbonate (ISC) groups in the polymers were measured by means of proton NMR. Deuterated chloroform ($CDCl_3$) was used as the solvent for the homopolymer samples, and deuterated tetrachloroethane (TCE) was used for the terpolymer samples. As can be seen from the results in Table 3, the small change in ratio from 1.021 to 0.986 results in a decrease in TMSC from 2.32 mol % to less than 0.05 mol % in the case of the BPA homopolymer (HP) and from 1.41 mol % to less than 0.05 mol % in the case of the terpolymer (TP). It should be noted that the free OH end groups in Table 3 refer to non-salicylate OH end groups such as those resulting from the incorporation of a dihydroxy compound monomer unit (e.g. BPA, hydroquinone or methyl hydroquinone) at a chain end.

In all of the polymer examples prepared, the content of all of the Fries rearrangement products (e.g. linear, acid and branched Fries), when measured using proton NMR, were below the detection limit of 100 ppm.

TABLE 3

Characterization of Extruded Polymer Pellets

| | | | Carbonate End Groups | | | Free OH End Groups | | | | | |
|---|---|---|---|---|---|---|---|---|---|---|---|
| | | | | | Total Carbonate End | | | MeHQ- | Total | Total free | Ratio Total Free |
| | | Mw | T-MSC | MeCarb | Groups | PC-OH | HQ-OH | OH | free OH | OH/ | OH/Total |
| Example | Polymer | g/mol | mol % | mol % | mol % | ppm | ppm | ppm | ppm | mol % | Carbonate |
| WE 1 | HP | 29592 | <0.05 | 0.19 | 0.19 | 1725 | 0 | 0 | 1725 | 2.27 | 11.92 |
| CE 1 | HP | 30584 | 2.32 | 0.53 | 2.85 | 80 | 0 | 0 | 80 | 0.1 | 0.04 |
| WE 2 | TP | 27409 | <0.05 | 0.25 | 0.25 | 512 | 796 | 711 | 2019 | 1.80 | 7.20 |
| CE 2 | TP | 36727 | 1.41 | 0.95 | 2.36 | 23 | 42 | 24 | 89 | 0.12 | 0.05 |

TABLE 2

| Machine Condition | Engel 45T UOM | HP | TP |
|---|---|---|---|
| Predry temp | ° C. | 120 | 105 |
| Predry time | hr | 2 | 3 |
| Temp. Hopper | ° C. | 40 | 40 |
| Temp. zone 1 | ° C. | 320 | 320 |
| Temp. Zone 2 | ° C. | 330 | 330 |
| Temp. Zone 3 | ° C. | 340 | 340 |
| Temp. Nozzle | ° C. | 335 | 335 |
| Temp. Mold | ° C. | 100 | 100 |
| Holding time | sec | 10 | 10 |
| Cooling time | sec | 128 | 128 |
| Cycletime | sec | 144 | 144 |
| Residence time | sec | 720 | 720 |

The color of molded 2.5 mm thick plaques was measured in the transmission mode using a Gretag-MacBeth 7000A spectrometer according to the CIE laboratory standard. A D65 light source was used with a 10° observation angle. The color parameters 1, a, and b of the molded plaques are given in Table 4.

TABLE 4

Color Properties of Molded Polymers

| | | | Molded Color | | |
|---|---|---|---|---|---|
| Example | Polymer | Ratio | L | a | b |
| WE 1 | HP | Reverse | 95.5 | −0.1 | 1.6 |
| CE 1 | HP | Normal | 95.2 | −0.3 | 2.6 |

TABLE 4-continued

Color Properties of Molded Polymers

| | | | Molded Color | | |
|---|---|---|---|---|---|
| Example | Polymer | Ratio | L | a | b |
| WE 2 | TP | Reverse | 91.0 | 1.0 | 7.9 |
| CE 2 | TP | Normal | 90.2 | 1.6 | 9.9 |

As shown, the compositions of the invention have better color properties than the comparative examples, particularly in terms of their lower b values.

The residual levels in the polymer samples were analysed by means of an HPLC analytical method. The solvent used was methylene chloride ($CHCl_3$) in the case of the homopolymers or a 4:1 mixture of $CHCl_3$ with 1,1,1,3,3,3-hexafluoroisopropanol (HFIP) in the case of the terpolymers. The homopolymer (HP) solution was shaken for at least one hour. The terpolymer (TP) was first treated in an ultrasonic bath for 15 min followed by shaking for 2 hrs. In both cases methanol was added to precipitate the polymer and the resulting solution was filtered through a 0.2 micron filter and injected on to HPLC. The results are summarized in Table 5.

TABLE 5

Residual Analysis of Polymers

| | | | | Residuals After Molding | | |
|---|---|---|---|---|---|---|
| Example | Polymer | Ratio | BPA | MS | BMSC | Total |
| WE 1 | HP | Reverse | 148 | 6 | 3 | 159 |
| CE 1 | HP | Normal | <4 | 925 | 134 | 1059 |
| WE 2 | TP | Reverse | 40 | 17 | 7 | 83 |
| CE 2 | TP | Normal | <4 | 557 | 93 | 650 |

As can be seen from residuals after molding are much lower than lower for the reverse ratio samples of the invention as opposed to the normal ratio samples. The major residual is methyl salicylate (MS), which is believed to come from release of the MS from the many terminal TMSC groups that occur in normal ratio samples.

Table 6 illustrates yet another benefit found with the process of this invention—not only do the polymer pellets themselves have a much lower level of internal chain defects than the corresponding polycarbonates made at normal ratio (excess carbonate), but the difference in levels of internal chain defects between the reverse and normal ratio materials becomes even more pronounced upon molding.

TABLE 6

| | | | IEL | |
|---|---|---|---|---|
| Example | Polymer | Ratio | Pellets | Molded |
| WE 1 | HP | Reverse | 0.12 | 0.11 |
| CE 1 | HP | Normal | 0.50 | 0.75 |
| WE 2 | TP | Reverse | 0.15 | 0.15 |
| CE 2 | TP | Normal | 0.63 | 1.03 |

EXAMPLE 2

For scale-up to commercial quantities, continuous manufacturing processes are desirable. Due to the high sensitivity of the monomers molar ratio in the polymer molecular weight, one of the big challenges when scaling up to a continuous process using activated diaryl carbonates deals with a fine adjustment of the monomer flows. Achieving high precision and accuracy in the monomer dosing can involve both very specific instrumentation and high process control capability, which add to the cost of the manufacturing facility and process.

In tests of the reverse ratio method of the present invention using a continuous process, it has been observed that when the carbonate to diols molar ratio is below one, the polymer molecular weight is significantly more stable. In addition, when operating at molar ratios lower than 1 in a continuous process, the amount of residuals such as methyl salicylate and the amount of branching Fries decrease significantly as compared to process when the molar ratios is greater than 1. Thus, the benefits of the present invention as described above are clearly obtained when operating a continuous mode.

Polymerization reactions were carried out in a continuous operation pilot plant operating with a series of two CSTR reactors and a reactive extruder. Reactor 1 conditions were 170-190° C. and atmospheric pressure. Reactor 2 was operated at 200-220° C. and 230-350 mbar. Vacuum levels in the reactive extruder were 25 mbar in the first section and 1-2 mbar in the second section of the extruder. Catalyst loading was: 3-4 ueq NaOH and 25-40 ueq TMAH. Polymer throughput was 40 kg/h. BPA was the monomer source and BMSC was used as the carbonate source.

Molecular weights are reported as molecular weight average (Mw) and were determined by GPC analysis of polycarbonate prepared by melt polymerization. Standards of polystyrene were used to construct a universal calibration against which polycarbonate could be measured using Mark-Houwink equation.

End Cap values of the samples was measured by applying the following equation:

$$\% \; EC = 100 - \frac{\text{ppm OH} + \text{Snell MN}}{340000}$$

The ppm OH of each sample was measured by FTIR (Perkin Elmer FTIR Spectrum One equipment), dissolving 0.5 gr of the sample in 25 mls of dried Chloroform. The ppm of OH were calculated measuring the absorbance at 3584 cm-1, using a univariable calibration, normalizing the absorbance by diving it by the 2779 cm-1 absorbance. The Snell Mn is calculated from the GPC Mw measurement.

Measurements were performed over 12 hours of a continuous run making BPA homopolymer and the characteristics of products from each sampling were determined to be as set forth in Table 7.

TABLE 7

FINAL PRODUCT ANALYSIS (CONTINUOUS RUN)

| Date/Time | BMSC Residual ppm | BPA Residual ppm | End Cap % | IEL % molar | MS Residual ppm | MN Dalton | MW Dalton | OH ppm | PDI | T-MSC % molar |
|---|---|---|---|---|---|---|---|---|---|---|
| Sample 1 | 6 | 98 | 51.63 | <0.4 | 0 | 27579 | 64104 | 1142 | 2.32 | <0.3 |
| Sample 2 | | | 50.96 | | | 27411 | 64098 | 1158 | 2.34 | |
| Sample 3 | 44 | 106 | 51.34 | <0.4 | 0 | 27499 | 64100 | 1149 | 2.33 | <0.3 |
| Sample 4 | | | 51.64 | | | 26908 | 62728 | 1167 | 2.33 | |
| Sample 5 | 9 | 109 | 51.92 | <0.4 | 0 | 27088 | 63290 | 1150 | 2.34 | <0.3 |
| Sample 6 | | | 52.46 | | | 26798 | 62797 | 1146 | 2.34 | |
| Sample 7 | 12 | 106 | 52.45 | <0.4 | 0 | 27085 | 62529 | 1151 | 2.31 | <0.3 |
| Sample 8 | | | 51.69 | | | 27780 | 63371 | 1154 | 2.28 | |
| Sample 9 | 5 | 108 | 52.01 | <0.4 | 0 | 27532 | 63062 | 1152 | 2.29 | <0.3 |
| Sample 10 | | | 52.3 | | | 27230 | 62791 | 1150 | 2.3 | |
| Sample 11 | 9 | 110 | 51.4 | <0.4 | 7 | 27399 | 62926 | 1169 | 2.29 | <0.3 |
| Sample 12 | | | 51.38 | | | 28116 | 64153 | 1147 | 2.28 | |
| Sample 13 | 7 | 103 | 51.9 | <0.4 | 0 | 27599 | 63637 | 1144 | 2.3 | <0.3 |
| Average | 13 | 106 | 51.8 | | 1 | 27386 | 63353 | 1152 | 2.3 | |
| Standard Deviation | 14 | 4 | 0.5 | | 3 | 363 | 603 | 8 | 0.0 | |

As can be seen, both the molecular weight and percent endcapping were very consistent throughout the 12 hours. In addition, the residual amount of methyl salicylate was zero in all but one sample. When the same reactor and conditions were used to produce BPA homopolymer with a ratio greater than one, the observed variability in molecular weight over 6 samples taken at intervals over a total of 10 hours was greater (std deviation 954) and the residual amounts of methyl salicylate was greater (avg 183). The percent endcapping observed in this run was also much higher (avg 98.71%). Thus, using the same equipment, much better performance control was obtained using the reverse ratio method of the invention.

EXAMPLE 3

Copolymer was prepared in a continuous process as described above using 70 mol % BPA/30 mol % HQ monomers and a ratio less than 1 in accordance with the present invention. A PCP chain stopper was chain stopper was added to the reaction mixture in an amount equaling 1 wt %. The polymer was processed in the extruder at 125 rpm. This low rpm (compared to a conventional rpm of 300) is possible because of the low level of MS obtained when running reverse ratio in continuous mode requires less energy input to the extruder to remove residual methyl salicylate. This reduction in the energy input in the extruder results simultaneously in less color and residuals levels within specification. A polymer having a YI value of about 1.4 was obtained with residual methyl salicylate of about 240 ppm, with an end cap value of 55.6%, PCP-End cap=22.1%, TMSC=0.3% (mol), OH=1102 ppm.

As a comparison copolymer was prepared in a continuous process as described above using 70 mol % BPA/30 mol % HQ monomers and under normal ratio. A PCP chain stopper was chain stopper was added to the reaction mixture in an amount equaling 1 wt %. The polymer was processed in the extruder at 300 rpm. A polymer having a YI of about 6.8 was obtained with residual methyl salicylate of about 430 ppm, an end cap value=89.8%, PCP-End Cap=25.1%, TMSC=0.96% (mol), and OH=257 ppm.

EXAMPLE 4

Terpolymer was prepared in a continuous process as described above using 33 mol % BPA/34 mol % HQ/33 mol % MeHQ monomers and a ratio less than 1 in accordance with the present invention. The polymer was processed in the extruder at 125 rpm. This reduction in the energy input in the extruder results simultaneously in less color and residuals levels within specification. A terpolymer having a YI value of about 9.1 was obtained with residual methyl salicylate of about 324 ppm, with an end cap value of 23.4%, T-MS=0.4% (mol), OH=1965 ppm.

As a comparison copolymer was prepared in a continuous process as described above using 33 mol % BPA/34 mol % HQ/33 mol % MeHQ monomers under a normal ratio. The polymer was processed in the extruder at 300 rpm. A polymer having a YI of about 27.3 was obtained having residual methyl salicylate of 711 ppm, with an end cap value of 92.3%, T-MS=1.8% (mol), OH=195.

Solution YI Calculations of Example 3 and 4:

Samples to measure YI in solution are prepared by dissolving 1 g of polymer or monomer in 20 mls of Chloroform (terpolymer samples were prepared in 15 ml dried chloroform and 5 ml HFIP). Once solubilized, samples are placed in a 1 cm$^3$ quartz cuvette inside a Perkin Elmer Lambda 800 equipment to measure the transmittances between 720 to 380 nm wavelength range. The yellowness index (YI) was obtained from the measured values as follows:

$$\text{Solution } YI = \frac{\% \ T(600 \ nm) - \% \ T(445 \ nm)}{\% \ T(555 \ nm)} \times 100\%$$

What is claimed is:

1. A method for preparing a polycarbonate comprising reacting a dihydroxy reaction component comprising a dihydroxy compound with carbonate reaction component comprising an activated diaryl carbonate in the presence of an esterification catalyst to produce a polycarbonate, wherein carbonate reaction component and the dihydroxy reaction component are reacted in a molar ratio of less than 1 when expressed to at least three decimal places.

2. The method of claim 1, wherein the dihydroxy compound is an aromatic dihydroxy compound.

3. The method of claim 2, wherein the activated diaryl carbonate is an ester-substituted diaryl carbonate.

4. The method of claim 3, wherein the molar ratio is 0.996 or less.

5. The method of claim 3, wherein the molar ratio is between 0.962 and 0.996, inclusive.

6. The method of claim 3, wherein the molar ratio is between 0.968 and 0.996, inclusive.

7. The method of claim 3, wherein the molar ratio is between 0.971 and 0.994, inclusive.

8. The method of claim 3, wherein the ester-substituted diaryl carbonate is bis(methyl salicyl)carbonate.

9. The method of claim 1, wherein the activated diaryl carbonate is an ester-substituted diaryl carbonate.

10. The method of claim 9, wherein the molar ratio is 0.996 or less.

11. The method of claim 9, wherein the molar ratio is between 0.962 and 0.996, inclusive.

12. The method of claim 9, wherein the molar ratio is between 0.968 and 0.996, inclusive.

13. The method of claim 9, wherein the molar ratio is between 0.971 and 0.994, inclusive.

14. The method of claim 9, wherein the ester-substituted diaryl carbonate is bis(methyl salicyl)carbonate.

15. The method of claim 1, wherein the dihydroxy compound is bisphenol A.

16. The method of claim 15, wherein the activated diaryl carbonate is an ester-substituted diaryl carbonate.

17. The method of claim 16, wherein the molar ratio is 0.996 or less.

18. The method of claim 16, wherein the molar ratio is between 0.962 and 0.996, inclusive.

19. The method of claim 16, wherein the molar ratio is between 0.968 and 0.996, inclusive.

20. The method of claim 16, wherein the molar ratio is between 0.971 and 0.994, inclusive.

21. The method of claim 16, wherein the ester-substituted diaryl carbonate is bis(methyl salicyl)carbonate.

22. The method of claim 1, wherein the dihydroxy reaction component comprises two or more dihydroxy compounds.

23. The method of claim 1, wherein the polycarbonate is a poly(carbonate-co-ester) and the dihydroxy reaction component comprises a diacid compound.

24. The method of claims 1, wherein the polycarbonate is a poly(carbonate-co-ester) and the carbonate reaction component comprises a diester compound.

25. The method of claim 1, wherein the polycarbonate is prepared in a continuous process.

26. A polycarbonate made in accordance with the method of claim 1.

27. A molded article molded from the polycarbonate of claim 26.

28. A polycarbonate having less than 0.5 mole % of terminal alkyl carbonate end groups, less than 1000 ppm of Fries rearrangement products, and free salicylate in the range of from 1 to 500 ppm, said polycarbonate containing free non-salicylate OH groups and carbonate end groups of the formula

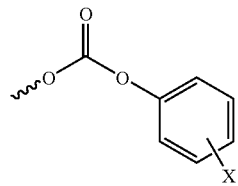

wherein X is one or more electron-withdrawing groups in the ortho or para positions, and wherein the free non-salicylate OH groups and carbonate end groups are present in a ratio of at least 0.1.

29. The polycarbonate of claim 28, wherein the polycarbonate has a number average molecular weight measured relative to polystyrene standards, Mn, of from 10,000 to 160,000 g/mol.

30. The polycarbonate of claim 28, wherein the polycarbonate comprises residues from a dihydroxy compound selected from the group consisting of hydroquinone, resorcinol, methylhydroquinone, butylhydroquinone, phenylhydroquinone, 4-phenylresorcinol and 4-methylresorcinol.

31. The polycarbonate of claim 28, wherein the free salicylate comprises methyl salicylate.

32. The polycarbonate of claim 28, wherein the carbonate end groups comprise ends groups of the formula

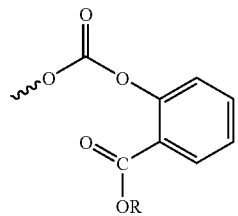

wherein R is alkyl, phenyl or benzyl.

33. The polycarbonate of claim 28, wherein the carbonate end groups comprise end groups of the formula

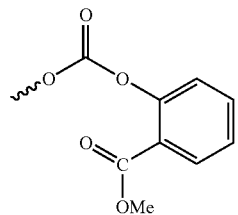

wherein Me is methyl.

34. A molded article molded from the polycarbonate of claim 28.

* * * * *